Oct. 9, 1934.  E. L. THEARLE  1,976,588
METHOD OF BALANCING ROTORS
Filed Sept. 23, 1932   3 Sheets-Sheet 1

Inventor:
Ernest L. Thearle,
by Charles E. Tullar
His Attorney.

Oct. 9, 1934.　　　　　E. L. THEARLE　　　　1,976,588
METHOD OF BALANCING ROTORS
Filed Sept. 23, 1932　　　　3 Sheets-Sheet 2
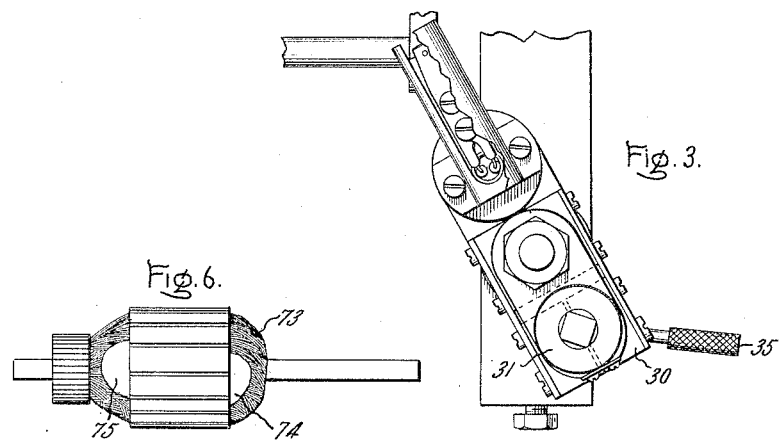
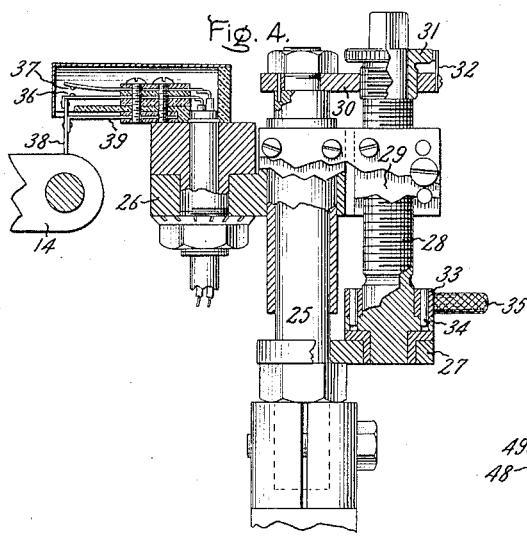
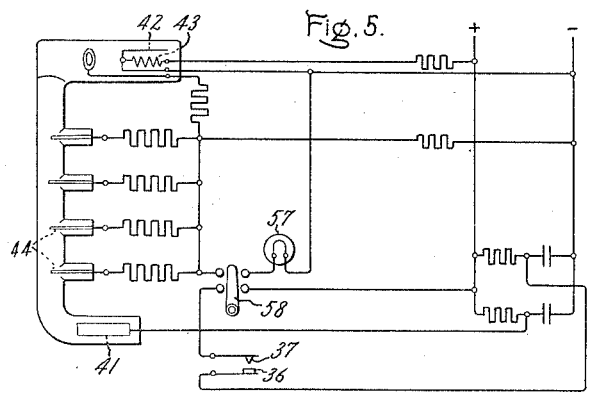
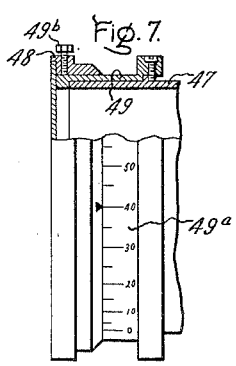
Inventor:
Ernest L. Thearle,
by Charles W. Tullar
His Attorney.

Oct. 9, 1934.  E. L. THEARLE  1,976,588
METHOD OF BALANCING ROTORS
Filed Sept. 23, 1932   3 Sheets-Sheet 3
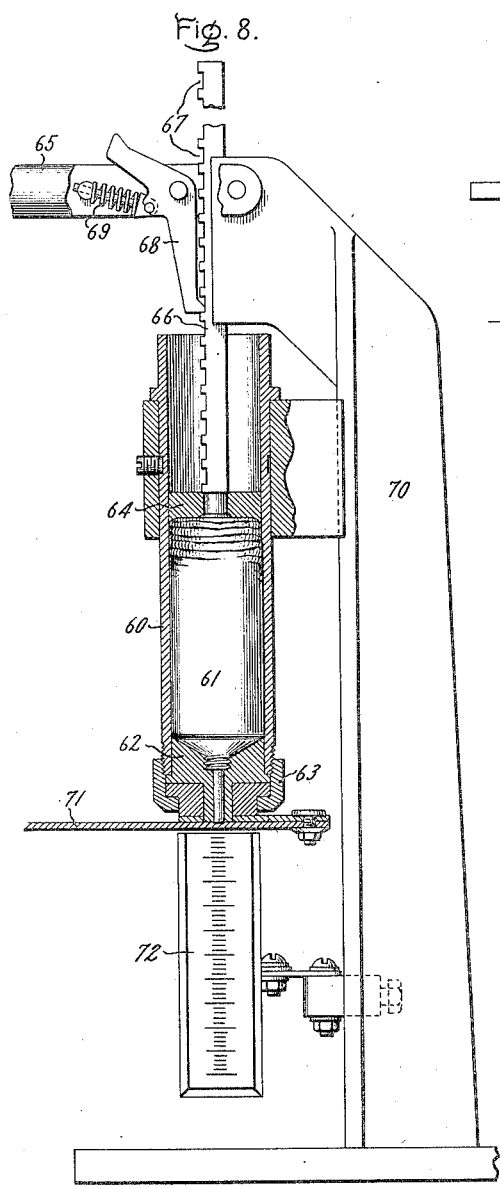
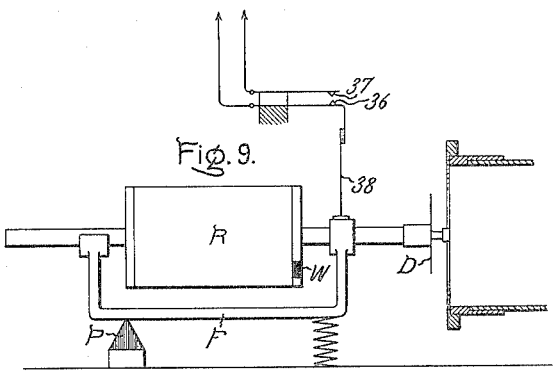
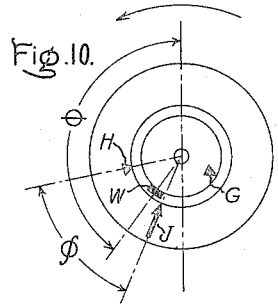
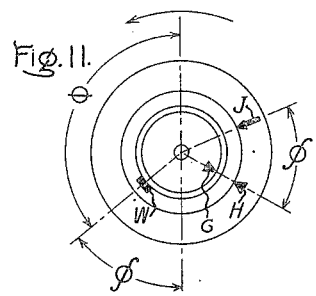
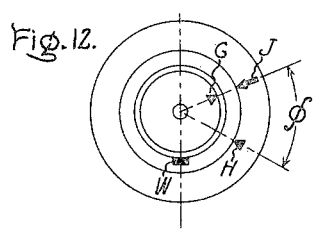
Inventor:
Ernest L. Thearle,
by *Charles E. Mullen*
His Attorney.

Patented Oct. 9, 1934

1,976,588

UNITED STATES PATENT OFFICE 1,976,588

METHOD OF BALANCING ROTORS

Ernest L. Thearle, Schenectady, N. Y., assignor to General Electric Company, a corporation of New York Application September 23, 1932, Serial No. 634,548

4 Claims. (Cl. 171—206)

In the manufacture of bodies designed to rotate at high speeds, as for example the rotors of electric motors, it is important that they be balanced dynamically so as to prevent vibration not only of the motor but of the apparatus driven thereby. It is particularly important to balance the rotors of small motors used in household appliances where the noise incident to vibrations caused by lack of balance is especially objectionable. Such motors in order to be sold on a competitive price basis must be relatively low in cost, and therefore the cost of properly balancing the rotors becomes an important item. Moreover due to their shape and construction, it is usually a difficult matter either to add or remove weight from a rotor to obtain the proper balance.

My invention has for its object the provision of an improved method of balancing and especially dynamically balancing rotating bodies whereby the time required to effect a balance is so reduced that the cost of the operation becomes an unimportant item. In carrying out this important feature of my invention, instead of adding metal to the light side of the body, as solder for example, or removing weight as by drilling holes in the heavy side, both of which are customary operations in practice, I add to the light side an amount of self hardening material sufficient to effect the balance, said material being at room temperature when applied and being plastic at such temperature.

A further object of my invention is the provision of a simple dynamic balancing machine whereby the lack of balance of a rotating body, the amount of weight required to be added to effect the balance, and the position where the weight is to be added may be quickly and accurately determined.

For a consideration of what I believe to be novel and my invention, attention is directed to the accompanying description and the claims appended thereto.

Figure 1:
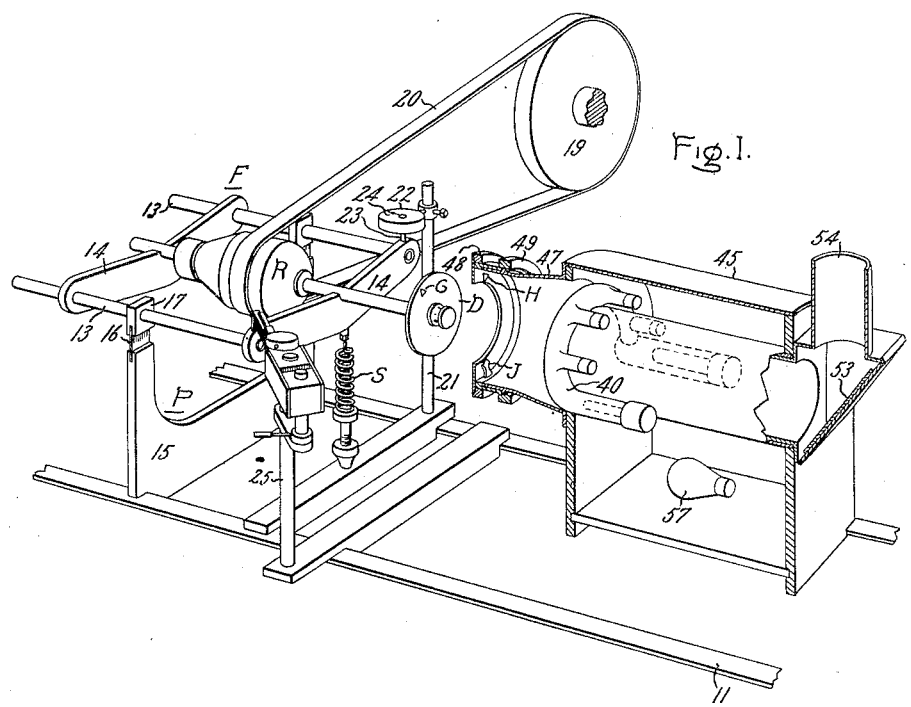
Figure 2:
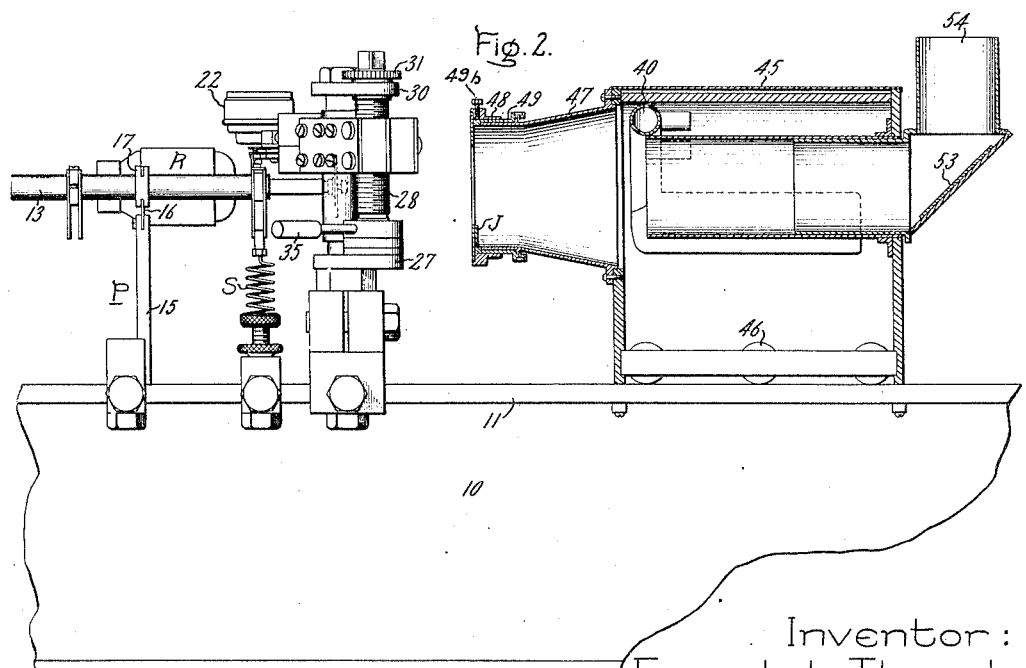

In the drawings which are illustrative of my invention, Fig. 1 is a perspective view of a balancing machine of the stroboscopic type with certain of the parts broken away; Fig. 2 is a view partly in front elevation and partly in section of the machine shown in Fig. 1; Fig. 3 is a plan view of the contact mechanism for causing periodic flashing of a source of light; Fig. 4 is a sectional view of said mechanism; Fig. 5 is a diagram of circuit connections; Fig. 6 is a view of a small motor armature to which balancing material has been added; Fig. 7 is a detail view, partly in section, of the means for manually moving a pair of the pointers; Fig. 8 is a view, partly in section, of the means for extruding and measuring the balancing materials; and Figs. 9 to 12 inclusive are diagrams illustrating the balancing operation.

10 indicates foundation rails or supports having out-turned flanges 11 to which certain of the parts are clamped and which also form tracks for other movable parts. The body to be balanced, in this case a small armature R for a high speed motor, is mounted on a cradle F comprising side bars 13 and end members 14, the latter having half bearings to receive the shaft of the armature. The cradle is pivotally supported in such a manner as to have one degree of freedom and that in a vertical plane. The pivot P for the cradle comprises a frame member 15 securely fastened to the base or support. The member has two upwardly extending arms each supporting a thin flexible piece of metal 16 which permit of vertical oscillatory movements of the cradle and prevent sidewise movements thereof. The upper ends of the parts 16 are secured in blocks 17 fastened to the side bars of the cradle. The parts 16 and blocks are located in the same transverse plane which is also a plane of correction. The right hand end of the cradle is supported by an adjustable compression spring S of such character as to support the weight of the parts and also permit the cradle to vibrate due to the presence of an unbalanced mass in the body or armature R. The armature is rotated above its resonant speed and that of the cradle system by a pulley 19 driven by a source of power, such as an electric motor. Motion from the pulley to the armature is transmitted by an endless belt 20. Because the armature is mounted in half bearings, it can be lifted and moved endwise to remove it without changing the position of driving pulley or opening the belt, all of which serves to save time in the balancing operation.

In the rear is a vertical fixed post 21 on the upper end of which is adjustably mounted a vibration indicator 22 having a depending pin 23 arranged to contact with the vibrating cradle and a pointer 24 moved by the pin over a suitable scale to indicate the aplitude of the cradle vibrations.

In order that the vibrations of the cradle may cause flashing of a source of light, a contact device is provided comprising a post 25 carried by and longitudinally adjustable on the base of the machine. On the post and guided in its vertical movements thereby is a support 26. To the post is secured a bottom plate 27 in which is seated the lower end of an adjusting screw 28, the latter extending through a nut 29 secured to the support 26. The top of the post 25 also supports an upper plate 30 which is parallel to the plate 27 and supports the upper end of the screw 28. To prevent longitudinal movements or lost motion of the screw 28, a nut 31 is carried by the upper plate and engages a shoulder on the screw formed by reducing the cross section thereof just above the screw threads. The nut 31 is held against accidental turning by the spring pressed lock 32.

Because it is necessary to adjust the contact device vertically with respect to the cradle in order that its vibrations may be caused properly to actuate the contact, means are provided for turning the adjusting screw 28, said means comprising a collar 33 which is seated on a shoulder formed on the lower end of the screw and having depending pins 34 which enter corresponding holes in said shoulder, and an actuating handle 35. Because the handle can only have a limited angular movement by reason of the presence of the post 25, it is necessary to provide means whereby a greater turning movement of the screw may be obtained. This result is obtained by having a considerable number of pin receiving holes in the shoulder on the screw. If the maximum movement of the handle is insufficient to obtain the necessary movement of the screw, the handle is turned to some position, then lifted and the pins 34 inserted in another set or pair of holes angularly displaced from the first, after which the handle is again moved. In this manner, a wide range of adjustment is obtained in a very simple way.

Mounted on the support 26 in a manner to move up and down with it is a contact device, best shown in Fig. 4, comprising a pair of contacts 36 and 37, each carried by a light flat spring, said contacts being normally separated. To the spring carrying contact 36 is attached a depending member 38 which is acted upon by the cross member 14 of the cradle directly underneath it. The member 38 is in part supported by the thin flat spring 39, said springs 36 and 39 forming a parallel motion support for the member.

Referring to Figs. 1 and 2, 40 indicates a source of light which is flashed each time the contacts 36 and 37 engage. For this purpose, a low voltage neon lamp is used; one operating at 250 volts is satisfactory. It is of generally circular form and has a suitably arranged anode 41, Fig. 5, a cathode 42, a heater 43 and probes 44. Current is supplied from any suitable source of power and interposed in the circuits are the usual condensers and resistances. The lamp is mounted in a closed casing 45 and the latter is supported by wheels 46 which roll on the tracks 11, the wires carrying current to the lamp being in the form of cable to permit of such movements. On the left hand end of the casing is a tubular extention 47 and mounted on the latter for circular movements is a pair of rings 48 and 49. The former carries a pointer or indicator H, Fig. 1, and the latter a longer pointer J, the two pointers being angularly adjustable with respect to each other so that the angle $\phi$ between them may be set or adjusted at will. The setting of this angle is a part of the calibration of the machine and need not be changed except occasionally when the machine is readjusted to accommodate a different type or size of rotor. On the ring 49 is a suitable scale $49^a$, Fig. 7, by means of which the angular relation of the pointers with respect to each may be ascertained for future reference. The rings are normally locked in their relative angular position by screws $49^b$.

Inside of the casing and in axial alignment with the armature being balanced is a tube the free end of which projects partly through the central part of the neon lamp. The other end of the tube is secured to a wall of the casing. Located in an extension of the casing is a mirror 53, and attached to the extension is a sight tube 54 by means of which the respective positions of the indicators or pointers may be observed.

On the end of the armature shaft is mounted a small light weight disk D having a pointer G thereon. If the shaft is large enough in diameter to receive a suitable indicator or pointer, the disk may be omitted. In order to be able to observe the respective positions of the pointers or indicators G, H and J after the circuit of the neon lamp is interrupted, an ordinary incandescent lamp 57 is located inside of the casing as shown in Fig. 1. It is controlled by the switch 58 as shown in Fig. 5 as is also the neon lamp.

Reference was made at the beginning of this specification to the use of a plastic self hardening material as a balancing medium, as distinguished from adding or removing metal from the armature or other body being balanced. This is a very valuable feature of my invention because it so greatly simplifies and reduces the cost of balancing over prior methods and constructions. Any compound material having the necessary characteristics may be employed, the principal of which are the following: an element to give weight, an element to give strength, and a self hardening binder, preferably one that hardens rather rapidly to avoid movement of the material after application, but which allows the material to remain plastic in the atmosphere long enough to permit of proper application. One suitable material comprises white lead to give weight, asbestos to give strength and alkyd resin to act as a binder. To the above may be added coloring matter in order that the balancing material may be of the same color as the adjacent surface of the armature to which it is applied. Such coloring matter is by preference a non-conductor of electricity.

Because of the requirements above noted, the balancing material must be kept from the air until used. A simple and effective way to do this is to place it in thin walled collapsible containers or tubes having small screw caps, such as are in general use for many purposes. In order to simplify and expedite the work of balancing, the container is utilized in a novel manner. Briefly, one end thereof is screwed into a cylinder head or other part with the body of the container fitting the cylinder wall. A piston or plunger fitting the cylinder is provided which as it moves inward forces material from the container. This arrangement not only protects the material but prevents the material from sticking to and hardening the walls of the cylinder and on the piston.

In Fig. 8 is illustrated a cylinder 60 in which is located a thin walled container 61, having one end screw threaded into a removable block 62 supported by the lower cylinder head 63. 64 indicates the piston which as it descends, due to the action of a lever 65, forces a small portion of the material from the container. The piston rod 66 has a series of notches 67 along one side which are engaged by a spring pressed pawl 68. The piston and rod are moved downwardly step by step by the ratchet and pawl arrangement, and by swinging the pawl to a position where the spring 69 passes over the dead center, the piston may be raised step by step to reload the cylinder. The cylinder and other parts are supported by a vertical standard 70 to which said parts are detachably secured. 71 indicates a pivotally supported knife for cutting off the piece of stringlike material issuing from the container. Below the knife is a suitably calibrated scale 72 so that all the operator has to do is force a length of material from the container measured by said scale. The scale is calibrated in terms of amplitude of vibration of the needle 24 as indicated by the scale on the vibration indicator 22. That is to say, a vibration of the needle 24 over a certain number of degrees corresponds to a certain number of units on the scale 72. The material after being extruded is then gathered and applied by the hand of the operator to the light part of the armature, say at one end where the windings are exposed. A small amount of force exerted by the thumb or a finger of the operator will squeeze the material into the spaces between the wires or other metal parts which due to their shape and relative positions serve as additional means for anchoring the corrective weight material.

In Fig. 6 is shown a small armature of ordinary form in which 73 indicates the end wires crossing from one side to the other, and 74 and 75 bodies of plastic material applied as balancing weights. Because the applied material is thin and covers a relatively large area, it is more effectively secured than would be the case if highly concentrated.

Figs. 9 to 12 illustrate diagrammatically the operation of balancing a rotor in accordance with my invention. The right hand end of the rotor is assumed to be out of balance by an amount represented by a weight W. As previously stated, the purpose of the machine is to locate the amount and position of a weight to correct for the unbalanced weight W.

The rotor R which has been mounted in the cradle is rotated by the belt 20, Fig. 1, at a definite constant speed which is preferably greater than the resonant speed of the rotor in its cradle system. The unbalanced weight W exerts on the rotor a centrifugal force, the vertical component of which is a periodic force. This force causes oscillations or vibrations of the cradle, about the pivot P, in a vertical plane. The vibrations of the cradle lag behind the weight producing the vibration by a definite angle $\theta$ which is independent of the amount of the unbalance weight. Thus at the instant the said weight is at the top of the rotor, the cradle has not yet reached the uppermost position in its oscillation. Or, to state the matter another way, when the cradle reaches its uppermost position in its oscillation, the said weight has moved past the top position by a certain fixed angle $\theta$ as shown in Fig. 10.

After the rotor R is brought up to balancing speed, the part 38 is gradually lowered by the adjusting screw 28, Fig. 4, until the neon or other lamp flashes which is at the instant the cradle F is at its uppermost position. The lamp, flashing once per revolution of the rotor, then illuminates the disk D and its pointer G at which time the pointer G appears to be stationary in some such position as indicated in Fig. 10. This illusion is due to the persistence of vision and is the well known principle of a stroboscope. Since at the instant of illumination, the cradle is at the top of its movement, the unbalance weight has moved beyond its top position by the angle of lag $\theta$ as shown in Fig. 10. While the image is being viewed, the rings 48 and 49 carrying the pointers H and J are turned by hand as a unit until pointer H coincides with the image of pointer G, as shown in Fig. 11. If the rotor be stopped in the position in which it appeared when rotating the unbalanced weight W will be in the position shown in Fig. 11 at an angle $\theta$, the angle of lag, down from its top position. If the rotor is now turned through an angle $\phi$ equal to 180° minus $\theta$ which is also a fixed angle independent of the amount of unbalance, or until pointers G and J coincide, then the unbalanced weight will be at the bottom of the rotor. The pointers H and J are adjusted in setting up the machine so that the angle between them is equal to $\phi$. This setting is found by trial. Therefore if the rotor is brought to rest with the pointers G and J coincident or turned to that position, the unbalanced weight will always be at the bottom of the rotor, and the point at which the corrective weight should be added will be at the top. The amount of weight which should be added at the above located point is proportional to the width of the blur of the needle 24 of the test indicator 22 which is actuated by the cradle F. This instrument thus measures the amplitude of vibration of the cradle. For each different design of rotor to be balanced, the constant for this proportionality is determined by trial and the scale 72 on the measuring device, Fig. 8, is laid out accordingly, which scale indicates the amount of material to be added for any number of units of vibration amplitude. After one end of the armature R is balanced it is reversed in position and the other end balanced according to the method above outlined.

The method of balancing rotors in the manner outlined has the advantage of simplicity and is one which requires only a very brief time to complete; a single operation for each end suffices to put the rotor in dynamic balance. In so far as the use of self hardening plastic material as a balancing weight is concerned, my invention is not limited to the use of the apparatus set forth since I may use any other and suitable type of apparatus to determine the amount of and location of the weight to be added.

By setting the angle $\phi$ between pointers H and J at a different value, the machine may be used to locate the heavy point of a rotor in case the balance is to be accomplished by removing material from the rotor.

The construction of the balancing machine disclosed is not claimed herein as it forms the subject matter of my divisional application Serial No. 685,956 filed August 19, 1933.

What I claim as new and desire to secure by Letters Patent of the United States is:

1. The additional step in the dynamic balancing of rotors, after the amount and location of an unbalanced mass therein are determined which comprises applying to a limited surface at an end of the rotor in a position to compensate for the unbalance, a body of material at room temperature which is plastic at that temperature and is also self hardening.

2. The additional step in the dynamic balancing of rotors, after the amount and location of an unbalanced mass therein are determined which comprises applying under manual pressure to an end surface of the rotor in a position to compensate for the unbalance, a body of material at room temperature which is plastic at that temperature and also self hardening, and manually spreading said material over a substantial area of the body but which is small as compared to the total area.

3. The additional step in the dynamic balancing of rotors having a core and windings of insulated wire, after the amount and location of an unbalanced mass therein are determined which comprises applying over the surface of and between a limited number of the wires of the rotor outside of the core in a position to compensate for said unbalance, a body of plastic material at room temperature, said material being a non-conductor of electricity and self hardening.

4. The additional step in the dynamic balancing of rotors having a core and windings of insulated wire with small spaces between some of the adjacent wires, after the amount and location of an unbalanced mass therein are determined which comprises applying to the rotor outside of the core in a position to compensate for said unbalance a body of non-conducting material plastic at room temperature which is self hardening at said temperature, and manually forcing some of the material under pressure between a few of the wires to form anchorages for the body.

ERNEST L. THEARLE.